INFRARED ABSORPTION SPECTRUM OF LIPOXAMYCIN SULFATE

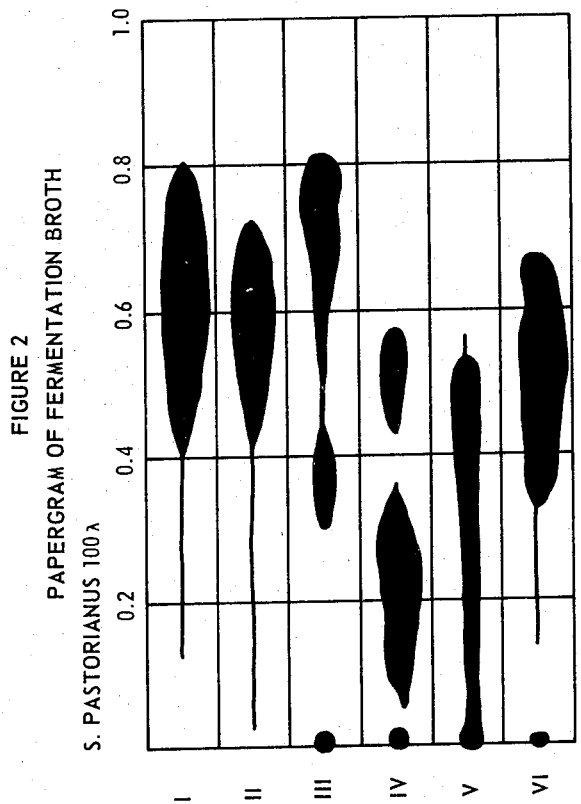

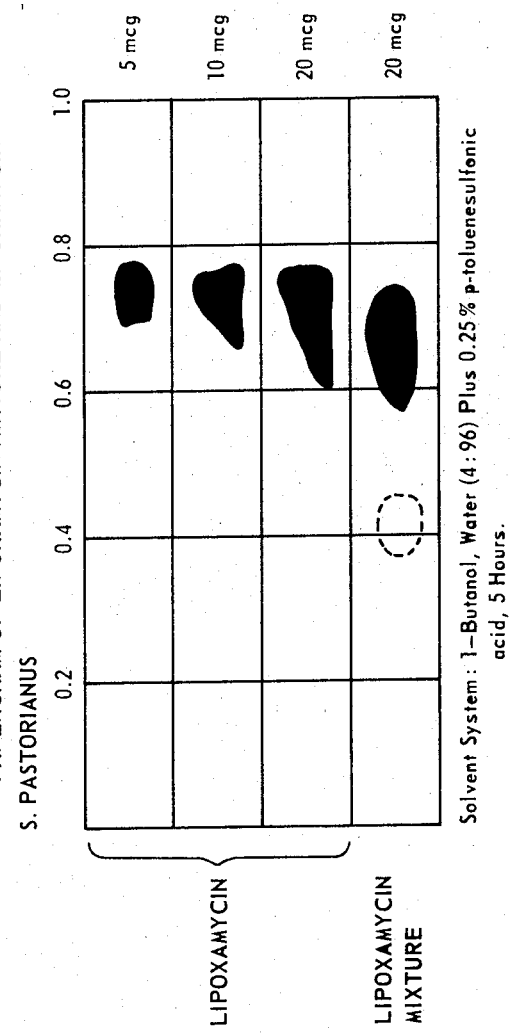

United States Patent Office 3,629,402
Patented Dec. 21, 1971

3,629,402
LIPOXAMYCIN AND PROCESS FOR PREPARING SAME
Oldrich K. Sebek, Kalamazoo, and Howard A. Whaley, Portage, Mich., assignors to The Upjohn Company, Kalamazoo, Mich.
Filed Apr. 28, 1969, Ser. No. 819,673
Int. Cl. A61k 21/00
U.S. Cl. 424—117       15 Claims

ABSTRACT OF THE DISCLOSURE

The lipoxamycin mixture of the subject invention is producible by culturing *Streptomyces virginiae* var. *lipoxae* var. *nova* in an aqueous nutrient medium. Lipoxamycin is the major component of said mixture. The lipoxamycin mixture and lipoxamycin inhibit the growth of *Staphylococcus aureus* and other microorganisms, and can be used to inhibit such microorganisms in various environments.

BRIEF SUMMARY OF THE INVENTION

The lipoxamycin mixture of the subject invention is producible by culturing a lipoxamycin mixture-producing actinomycete in an aqueous nutrient medium. The mixture and lipoxamycin (U–26, 146D) are amphoteric and have the property of adversely affecting the growth of Gram-positive and Gram-negative bacteria, for example, *Staphylococcus aureus, Bacillus subtilis, Streptococcus faecalis, Streptococcus hemolyticus, Diplococcus pneumoniae, Escherichia coli, Proteus vulgaris, Klebsiella pneumoniae, Salmonella schottmuelleri,* and *Pseudomonas aeruginosa.* They are also active against various fungi, for example, *Geotrichum sp., Hormodendrum compactum, Phialophora verrucosa, Cryptococcus neoformans, Histoplasma capsulatum, Sporotrichum schenkii, Monosporium apiospermum, Trichophyton rubrum, Trichophyton interdigitale,* and *Microsporum canis.*

The lipoxamycin mixture and lipoxamycin can be used alone or in combination with other antibiotic agents to prevent the growth of, or reduce the number of bacteria and fungi, as disclosed above, in various environments. For example, they can be used as disinfectants on various dental and medical equipment contaminated with *Staphylococcus aureus*. They can be used as antifungal agents in industrial preservatives, for example, as an antifungal rinse for laundered clothes and for impregnating papers and fabrics; also, for suppressing the fungal growth of sensitive organisms in plate assays and other biological media.

BRIEF DESCRIPTION OF THE DRAWING

FIG. 2—Papergram of fermentation broth.
FIG. 3—Papergram of lipoxamycin mixture and lipoxamycin.

DETAILED DESCRIPTION

Figure 1:
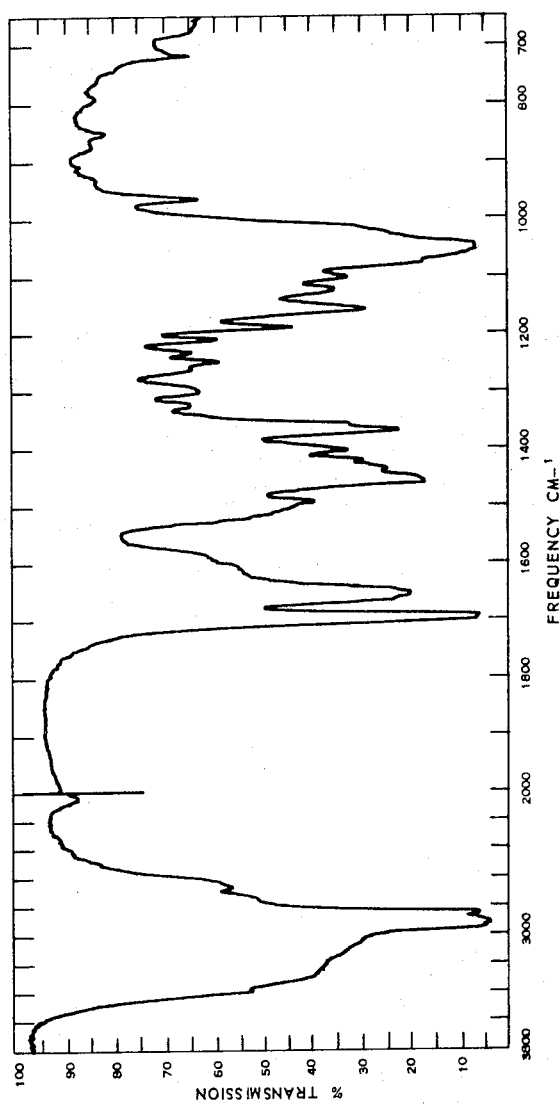
FIG. 1—Infrared absorption spectrum of anhydrous lipoxamycin sulfate in mineral oil mull.

Chemical and physical properties of the lipoxamycin mixture as the sulfate salt

Elemental analysis.—Found (percent): C, 54.30; H, 9.01; N, 6.36; S, 3.75.
Optical rotation: $[\alpha]_D^{25} = -7°$ (c., 0.408 in dimethylsulfoxide).
Melting point: 154–155° C. dec.
Ultraviolet spectrum: $\lambda_{max.}$ 209; (In MeOH) $\epsilon$, 5,600 and 275 sh., $\epsilon$, 63.
Titration: Eq. wt. 209 with first break at 437. Back titration in 60% ethanol, observed $pK'a_1 = 6.8$ and $pK'a_2 = 9.8$.

Infrared spectrum: The infrared absorption spectrum of the anhydrous lipoxamycin mixture suspended in mineral oil mull is indistinguishable from the infrared absorption spectrum for anhydrous lipoxamycin shown in FIG. 1.

Chemical and physical properties of lipoxamycin mixture as the free base

Elemental analysis.—Calc'd for $C_{19}H_{36}N_2O_5$ (percent): C, 61.26; H, 9.74; N, 7.52; O, 21.48. Found (percent): C, 61.75, 61.27; H, 9.70, 9.72; N, 7.47; O, 21.40.
Melting point: 68–70° C. dec.
Optical rotation: $[\alpha]_D^{25} = -2°$ (c., 0.877 in methanol).
Infrared spectrum: Lipoxamycin mixture free base has a characteristic infrared absorption spectrum when suspended in mineral oil mull. Following is a list of the bands in this spectrum. The wave lengths are expressed in reciprocal centimeters: 3340 (W), 3280 (W), 3150 (W), 2930 (S) (oil), 2900 (S) (oil), 2840 (S) (oil), 1700 (S), 1650 (M) (sh.), 1640 (M), 1567 (M), 1460 (S) (oil), 1410 (M), 1375 (S) (oil), 1365 (M) (sh.), 1325 (W), 1300 (W), 1240 (W), 1220 (W) (sh.), 1213 (W) (sh.), 1200 (M), 1155 (W), 1135 (W) (sh.), 1090 (M), 1050 (W), 975 (W), 960 (W) (sh.), 890 (W), 770 (W), 725 (W).

Chemical and physical properties of lipoxamycin sulfate

Elemental analysis.—Calc'd for $C_{19}H_{36}N_2O_5 \cdot \frac{1}{2}H_2SO_4$ (percent): C, 54.13; H, 8.85; N, 6.64; S, 3.80. Found (percent): C, 54.18; H, 8.93; N, 6.27; S, 3.72.
Melting point: 153.3° C. dec.
Optical rotation: $[\alpha]_D^{25} = -10°$ (c., 0.696 dimethylsulfoxide).
Ultraviolet spectrum: Lipoxamycin has the following UV absorption spectrum in methanol: $\lambda_{max.}$ 208; $\epsilon$, 5,450 and 275 sh.; $\epsilon$, 63.
Infrared spectrum: The infrared absorption spectrum of anhydrous lipoxamycin suspended in mineral oil mull is reproduced in FIG. 1 of the drawing. Lipoxamycin gives bands at the following wave lengths expressed in reciprocal centimeters: 3380 (M), 3250 (M), 3040 sh. (S), 2760 (M), 2670 (M), 2040 (W), 1700 (S), 1667 (S), 1660 (S), 1612 (M), 1517 (M), 1498 (M), 1465 (S), 1442 (S), 1427 (S), 1410 (S), 1375 (S), 1364 (S), 1330 (M), 1307 (M), 1267 (M), 1255 (M), 1238 (M), 1217 (M), 1196 (M), 1164 (S), 1129 (S), 1109 (S), 1082 (S), 1059 (S), 1032 sh. (S), 973 (M), 938 (W), 917 (W), 885 (W), 861 (W), 800 (W), 728 (M), 685 (M).

Band intensities are indicated as "S," "M," and "W," respectively, and are approximated in terms of the background in the vicinity of the bands. An "S" band is of the same order of intensity as the strongest in the spectrum; "M" bands are between one-third and two-thirds as intense as the strongest bands, and "W" bands are less than one-third as intense as the strongest band. These estimates are made on the basis of a percent transmission scale. The designation (sh.) refers to a shoulder.

Solubility at 25° C.:                                   Mg./ml.
   $H_2O$ _____ <1
   $CH_3OH$ _____ 1, 10 (hot)
   Dimethylformamide _____ 5
   Methylpyrrolidone _____ 5
   Dimethylsulfoxide _____ 15

Lipoxamycin is obtained from the lipoxamycin mixture by countercurrent distribution in a Craig apparatus.

THE MICROORGANISM

The actinomycete used according to this invention for the production of the lipoxamycin mixture is *Streptomyces virginiae* var. *lipoxae* var. nova. One of its strain characteristics is the production of the lipoxamycin mixture. A subculture of the living organism has been deposited, without restriction, and can be obtained from the permanent collection of the Northern Utilization and Research Division, Agricultural Research Service, U.S. Department of Agriculture, Peoria, Ill., U.S.A. Its accession number in this repository is NRRL 3630.

The microorganism of this invention was studied and characterized by Alma Dietz of The Upjohn Research Laboratories.

*Stropetomyces virginiae* var. *lipoxae* var. nova is compared with other Streptomyces species in the Ektachrome library of the Upjohn collection and is found to be most similar to *Streptomyces virginiae* Strain NA255–B8 Grundy et al. [Antibiotics and Chemotherapy 2: 399–408 (1952)]. The identity of the new variety is confirmed by microscopic and macroscopic observations as presented in the following description. Differences between the type culture and the new soil isolate are sufficient to warrant the designation of the latter as a new variety.

DESCRIPTION OF THE MICROORGANISM

*Streptomyces virginiae* var. *lipoxae* is compared with *Streptomyces virginiae* Strain NA255–B8 Grundy et al. *Color Characteristics.* Aerial mycelium shades of pink. Melanin negative. Appearance on Ektachrome is given in Table 1. Reference color charactersitics are given in Table 2. The cultures may be placed in the Red (R) color series of Tresner and Backus [Appl. Microbiol. 11: 335–338 (1962)] and on one medium in their white (W) series.

Microscopic characteristics

Spores smooth, rectangular. Spore surface ridged with much surface detail. Spore chains straight to loose open spiral, to corkscrew or knotlike spiral at end of spore chain [RF, RA, S in the sense of Pridham et al., Appl. Microbiol. 6: 52–79 (1958)].

Cultural and biochemical characteristics (see Table 3)

*Carbon utilization.*—The ability of the culture to grow on carbon compounds was determined in the synthetic medium of Pridham and Gottlieb [J. Bacteriol. 56: 107–114 (1948)] and in their modified medium [International Journal of Systematic Bacteriology 16: 313–340 (1966)]. In Pridham and Gottlieb's medium both cultures grew well on D-xylose, L-arabinose, D-galactose, D-glucose, D-mannose, maltose, cellobiose, dextrin, soluble starch, glycerol, and sodium acetate; the type culture grew well and the variety moderately on rhamnose, and D-fructose. Both cultures grew moderately on sucrose, lactose, raffinose, dulcitol, D-mannitol, D-sorbitol, inositol, and on the basal medium without a carbon compound. On inulin and sodium tartrate, the type culture grew moderately; growth of the variety was poor. On salicin, the type had poor growth; the variety moderate growth. On sodium citrate and sodium succinate the type had poor growth; the variety grew well. Neither culture grew on phenol, cresol, sodium formate, sodium oxalate, or sodium salicylate. In the modified medium both cultures had trace growth on the basal medium without a carbon compound, good growth on the glucose control, doubtful growth on D-fructose, and no growth on sucrose, inositol, D-mannitol, raffinose, and cellulose. The type culture had no growth on L-arabinose or D-xylose; the variety had fair growth on L-arabinose and good growth on D-xylose. The type culture had doubtful growth on rhamnose; the variety had no growth.

*Temperature.*—Both strains grew well at temperatures of 18–28° C. Growth was poor at 37° C.; trace in 24 hours at 55° C.

*Source.*—Soil.

*Type culture.*—*Streptomyces virginiae* strain NA255–B8 Grundy et al.

*Type variety.*—The type species is understood to be the type variety according to Rule 21 of the International Code of Nomenclature of Bacteria [Intern. J. System. Bacteriol. 16: 459–490 (1966)].

*Variety nova.*—*Streptomyces virginiae* var. *lipoxae* var. *nova*.

The characteristics of *Streptomyces virginiae* var. *lipoxae* are given in the following tables:

Table 1—Appearance of *Streptomyces virginiae* var. *lipoxae* and *Streptomyces virginiae* on Ektachrome.

Table 2—Reference color characteristics of *Streptomyces virginiae* and *Streptomyces virginiae* var. *lipoxae* (A) color characteristics on three agar media; (B) aerial color mass.

Table 3—Cultural characteristics of *S. virginiae* v. *lipoxae* and *S. virginiae*.

TABLE 1

Appearance of *Streptomyces virginiae* var. *lipoxae* and *Streptomyces virginiae* on Ektachrome [1]

| Agar medium | | S. virginiae v. lipoxae | S. virginiae NA255-B8 |
|---|---|---|---|
| Bennett's | S | Pink | Pink. |
| | R | Tan | Tan. |
| Czapek's sucrose | S | Pale pink | Pale pink. |
| | R | Colorless | Colorless. |
| Maltose-tryptone | S | Fair pink-white | Pink-white. |
| | R | Brown | Brown. |
| Peptone-iron | S | No surface growth | No surface growth. |
| | R | Brown | Brown. |
| 0.1% tyrosine | S | Fair pink | Pink. |
| | R | Red | Red. |
| Casein starch | S | Pink | Pink. |
| | R | Pink-tan | Pink-tan. |

[1] Dietz, A., "Ektachrome Transparencies as Aids in Actinomycete Classification," Annals of the New York Academy of Sciences, 60:152-154, 1954.

NOTE.—S=Surface; R=Reverse.

TABLE 2

[Reference color characteristics of *Streptomyces virginiae* and *Streptomyces virginiae* var. *lipoxae*]

A. Color Characteristics on Three Agar Media

| Agar medium | | Color Harmony Manual, 3d ed. 1948 [1] | | NBS Circular 553, 1955 [2] | |
|---|---|---|---|---|---|
| | | S. virginiae v. lipoxae | S. virginiae NA255-B8 | S. Virginiae v. lipoxae | S. virginiae NA255-B8 |
| Bennett's | S | 5dc (g) pussy willow gray | 5fe (g) ashes | 10 gm pinkish gray | 63 m light browinsh gray. |
| | R | 2gc (g) bamboo, chamois | 2gc (g) bamboo, chamois | 90 gm grayish yellow | 90 gm grayish yellow. |
| | P | 2gc (g) covert tan, beige | 3ge (g) beige, camel | do | 79 m light grayish. yellowish brown, 94 m light olive brown. |
| Czapek's sucrose | S | 2dc (g) natural, string | 3dc (g) natural | 93 gm yellowish gray | |
| | R | do | do | do | |
| | P | | | | |
| Maltose-tryptone | S | 5ba (g) shell pink | 5ba (g) shell pink | 9 m pinkish white | 9 m pinkish white. |
| | R | 3ie (g) camel, maple sugar, tan | 3gc (g) light tan | 76 m light yellowish brown, 77 g moderate yellowish brown. | 76 gm light yellowish brown. |
| | P | 3ig (g) adobe brown, cinnamon brown, light brown. | 2gc (m) bamboo, chamois | 77 gm moderate yellowish brown. | 90 gm grayish yellow. |

B. Aerial Color Mass
(Tresner & Backus,[3] Shirling & Gottlieb[4])

| Agar medium | S. virginiae v. lipoxae | S. virginiae NA255-B8 |
|---|---|---|
| Bennett's | 5dc red series | 5dc red series. |
| Czapek's sucrose | 3ca red series | 4ec red series. |
| Maltose-tryptone | 5cb red series | b white series. |
| Yeast extract-malt extract (ISP-2) | 5ge red series | 5dc red series. |
| Oatmeal (ISP-3) | 5ge red series | 5ec red series. |
| Inorganic salts starch (ISP-4) | 5dc red series | 5dc red series. |
| Glycerol asparagine (ISP-5) | 5cb red series | 5cb red series. |

[1] Jacobson, E., W. C. Granville and C. E. Foss, 1948. Color Harmony Manual, 3d ed. Container Corporation of America, Chicago, Ill.
[2] Kelly, L. K. and D. B. Judd, 1955. The ISCC-NBS Method of Designating Colors and a Dictionary of Color Names. U.S. Dept. Comm. Circ. 553.
[3] Tresner, H. D. and E. J. Backus, 1962. System of Color Wheels for Streptomycete Taxonomy. Appl. Microbiol. 11:335-338.
[4] Shirling, E. B. and D. Gottlieb, 1966. Methods for Characterization of streptomyces species. International Journal of Systematic Bacteriology 16:313-340.

NOTE.—S=Surface; R=Reverse; P=Pigment; (g)=Gloss Matte.

The lipoxamycin mixture of the invention is produced when the organism elaborating it is grown in an aqueous nutrient medium under submerged aerobic conditions. It is to be understood, also, that for the preparation of limited amounts, surface cultures in bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, corn starch, galactose, dextrin, molasses, and the like. Preferred nitrogen sources include corn steep liquor, yeast, autolyzed brewer's yeast with milk solids, soybean meal, cottonseed meal, corn meal, milk solids, pancreatic digest of casein, distiller's solubles, fish meal, animal peptone liquors, meat and bone scraps, and the like. A combination of these carbon and nitrogen sources can be used advantageously. Trace metals, for example, zinc, magnesium, manganese, cobalt, iron, and the TABLE 3
[Cultural characteristics of S. virginiae v. lipoxae and S. virginiae]

| | | S. virginiae v. lipoxae | S. virginiae, NA255-B8 |
|---|---|---|---|
| Agar media: | | | |
| Peptone-iron | S | No aerial growth | No aerial growth. |
| | R | Brown | Brown. |
| | O | Melanin positive | Melanin positive. |
| Calcium-malate | S | Pale pink | Pale pink. |
| | R | Colorless | Colorless. |
| | O | No pigment, Malate not solubilized | No piment, Malate not solubilized. |
| Glucose-asparagine | S | Pale pink-salmon | Pale pink-salmon. |
| | R | Cream | Cream. |
| | O | No pigment | No pigment. |
| Skim milk | S | Trace pale pink | None to trace pale pink. |
| | R | Tan | Yellow to yellow-tan. |
| | O | Yellow-tan pigment Casein slightly solubilized | Yellow-tan pigment. Casein slightly solubilized. |
| Tyrosine | S | Pale pink | Pale pink. |
| | R | Tan-brown | Yellow-tan. |
| | O | Tan pigment, tyrosine solubilized | Yellow pigment, Tyrosine solubilized. |
| Xanthine | S | Pale pink | Pale pink. |
| | R | Yellow | Yellow. |
| | O | Pale yellow pigment, xanthine solubilized around growth | Pale yellow pigment, xanthine solubilized around growth. |
| Yeast extract-malt extract | S | Pink | Pink. |
| | R | Yellow-tan | Yellow. |
| | O | Pale yellow pigment | Pale yellow pigment. |
| Casein starch | S | Pink | Pink. |
| | R | Pink-tan | Pink-tan. |
| | O | Starch hydrolyzed | Starch hydrolyzed. |
| Nutrient starch | S | Pink-white | Pink-white. |
| | R | Cream-yellow | Cream-yellow. |
| | O | Pale yellow pigment | Pale yellow pigment. |
| Sabourauds' dextrose | S | Pink-white | Trace white. |
| | R | Yellow-tan | Yellow. |
| | O | Yellow pigment | Yellow pigment. |
| Bennett's | S | Pink | Trace pink-white. |
| | R | Tan | Yellow. |
| | O | Tan | Do. |
| Czapek's sucrose | S | Pink | Pink-tan. |
| | R | Gray-pink | Gray-pink. |
| | O | | |
| Maltose tryptone | S | Pink-white | Pink-white. |
| | R | Brown | Tan. |
| | O | do | Tan. |
| Peptone-yeast extract-iron (ISP-6.) | S | No aerial growth | No aerial growth. |
| | R | Brown | Brown. |
| | O | Melanin positive | Melanin positive. |
| Tyrosine (ISP-7) | S | Pink | Pink. |
| | R | Tan | Tan-yellow. |
| | O | No pigment | No pigment. |
| Gelatin Media: | | | |
| Plain | S | | |
| | O | Tan brown pigment at top; tan below, no liquefaction. | Tan brown pigment at top; tan below, no liquefaction. |
| Nutrient | S | | |
| | O | Tan brown pigment at top; tan below, no liquefaction. | Tan brown pigment at top; tan below, no liquefaction. |
| Broth media: | | | |
| Synthetic nitrate | S | | |
| | O | Compact growth at base, nitrate not reduced to nitrite. | Compact growth at base, nitrate not reduced to nitrite. |
| Nutrient nitrate | S | White aerial growth on surface ring | White aerial growth on surface ring. |
| | O | Compact growth at base, tan pigment, nitrate not reduced to nitrite. | Compact growth at base, tan pigment, nitrate not reduced to nitrite. |
| Litmus milk | S | Trace pink-white aerial growth on blue surface ring. | Trace pink-white aerial growth on blue surface ring. |
| | O | No peptonization, no coagulation, pH 7.5. | No peptonization, no coagulation, pH 7.6. |

NOTE.—S=Surface; R=Reverse; O=Other characteristics.

like need not be added to the fermentation since tap water and unpurified ingredients are used as media components.

Production of the lipoxamycin mixture of the invention can be effected at any temperature conducive to satisfactory growth of the microorganism, for example, between about 18° and 40° C. and preferably between about 25° and 30° C. Ordinarily, optimum production of the compound is obtained in about 2 to 10 days. The medium normally stays fairly close to neutral pH, or on the alkaline side during the fermentation. The final pH is dependent, in part, on the buffers present, if any, and in part on the initial pH of the culture medium which is advantageously adjusted to about pH 6-8 prior to sterilization.

When growth is carried out in large vessels and tanks, it is preferable to use the vegetative form, rather than the spore form of the microorganism for inoculation to avoid a pronounced lag in the production of the new compound and the attendant inefficient utilization of equipment. Accordingly, it is desirable to produce a vegetative inoculum in a nutrient broth culture by inoculating the broth culture with an aliquot from a soil or slant culture. When a young, active, vegetative inoculum has thus been secured, it is transferred aseptically to large vessels or tanks. The medium in which the vegetative inoculum is produced can be the same as, or different from, that utilized for the production of the new compound, as long as it is such that a good growth of the microorganism is obtained.

Lipoxamycin and lipoxamycin mixture of the invention are amphoteric and their sulfate salts are relatively insoluble in hydrocarbons and chlorinated hydrocarbons. Lipoxamycin free base, as used herein, is that form of lipoxamycin which exists around pH 7.5-8.5 and is solvent soluble and extractable in the various procedures herein described. While technically incorrect since the antibiotic is amphoteric, it is a practical, descriptive term because the weakness of the acid function allows this form to react as a free base would in many circumstances. The definition of lipoxamycin mixture free base, as the term is used herein, is the same as above. The free base form of lipoxamycin mixture and lipoxamycin is obtained by dissolving a salt of these compounds, for example, the sulfate salt, in dilute NaOH to a pH of about 8.5, and then extracting the free base from this solution with ethyl acetate.

A variety of procedures can be used in the isolation and purification of the lipoxamycin mixture, for example, solvent extraction, liquid-liquid distribution in a Craig apparatus, use of absorbents, and chromatography columns. Solvent extraction procedures are preferred for commercial production inasmuch as they are less time consuming and less expensive, and higher recovery yields are obtained thereby.

In a preferred recovery process, the mycelium and undissolved solids are first separated from the fermentation beer by conventional means, such as by filtration with the use of a filter aid (or by centrifugation). The filtered beer (or centrifuged beer) is extracted with a solvent for lipoxamycin mixture. Methylene chloride is preferred. The methylene chloride extract containing the lipoxamycin mixture is concentrate in vacuo. This concentrate is then mixed with an organic or inorganic acid to precipitate out the lipoxamycin mixture as a crude crystalline material. When sulfuric acid is used to precipitate the lipoxamycin mixture, there is isolated a crude crystalline sulfate salt of the lipoxamycin mixture. This preparation can be used in environments where higher purity or resolution of the lipoxamycin mixture is not necessary.

The lipoxamycin mixture can be extracted from the filtered beer by the use of other solvents, for example, methylisobutylketone (MIBK), butyl acetate, chloroform, ethyl acetate, and butanol.

Alternatively, the lipoxamycin mixture of the invention can also be recovered from the filtered beer by adsorption on cationic exchange resins. Both the carboxylic and sulfonic acid types can be used. Suitable carboxylic acid resins include the polyacrylic acid resins obtained by the propolymerization of acrylic acid and divinylbenzene by the procedure given on page 87 of Kunin, Ion Exchange Resins, 2nd ed., 1958), John Wiley & Sons, Inc. Carboxylic acid cation exchange resins of this type are marketed under the trade names Amberlite IRC-50 and Zeokarb 226. Suitable sulfonic acid resins include nuclear sulfonated polystyrene resins crosslinked with divinylbenzene which are obtained by the procedure given on page 84 of Kunin, supra. Sulfonated cation exchange resins of this type are marketed under the trade names Dowex-50, Amberlite IR-120, Nalcite HCR, Chempro C-20, Permatit Q, and Zeokarb 225.

The lipoxamycin mixture is eluted from the resin with an acid, advantageously at a pH lower than the pKa of the cation exchange resin used. Satisfactory results are obtained with a pH of about 1 to 6. The eluate is adjusted to about pH 7.5 to 8.5 with a base, e.g., sodium hydroxide, or a strongly basic anion exchange resin, and the lipoxamycin mixture is extracted with a water-immiscible solvent according to the process described above. (Suitable anion exchange resins for this purpose are obtained by chloromethylating by the procedure given on pages 88 and 97 of Kunin, supra, polystyrene crosslinked, if desired, with divinylbenzene prepared by the procedure given on page 84 of Kunin, supra, and quaternizing with trimethylamine or dimethylethanolamine by the procedure given on page 97 of Kunin, supra. Anion exchange resins of this type are marketed under the trade names of Dowex-2, Dowex-20, Amberlite IRA-400, Duolite A-102, and Permatit S-1.)

The novel lipoxamycin mixture of the invention also can be recovered from harvested beers and other aqueous solutions by adsorption on a surface active adsorbent, for example, Florisil (a synthetic silicate of the type described in U.S. Pat. 2,393,625 and sold by the Floridin Company), decolorizing carbon, or decolorizing resins, and eluting the adsorbed material with a solvent Any of the solvents mentioned above can be used. A suitable decolorizing resin is Permatit DR (U.S. Pat. 2,702,263).

Further purification of the crude lipoxamycin mixture, as obtained above, can be achieved by recrystallization from a solvent, for example, methanol.

Separation of lipoxamycin from the lipoxamycin mixture can be achieved by countercurrent distribution in a Craig apparatus. For example, upon subjecting the p-toluenesulfonic acid salt of the lipoxamycin mixture to 195 transfers between the phases of a system of ethyl acetate, ethylene glycol monomethyl ether, water (2:1:1) in a 10 ml./phase Craig distribution apparatus, lipoxamycin, free of the lipoxamycin mixture, is found on the lower distribution side of the distribution peak. Tubes containing only lipoxamycin, as shown by the paper chromatographic procedure described herein, are combined and evaporated in vacuo to give a solid residue which is reconverted to lipoxamycin sulfate salt by treatment with aqueous sulfuric acid.

The lipoxamycin mixture of the invention, as well as lipoxamycin separated therefrom, can be purified by successive transfers from protonated to non-protonated forms and vice versa, especially with other types of treatments intervening as, for example, solvent extractions and washings, chromatography, and fractional liquid-liquid extraction. In this manner salts of the lipoxamycin mixture and lipoxamycin can be employed to isolate or upgrade the lipoxamycin mixture and lipoxamycin, respectively. For example, the lipoxamycin mixture, or lipoxamycin, can be converted to an insoluble salt, such as the sulfate, which can be subjected to purification procedures and then used to regenerate the lipoxamycin mixture, or lipoxamycin, by treatment with alkali.

Alkaline salts of lipoxamycin mixture or lipoxamycin are formed above about pH 10 with strong bases. Degradation to antibiotic inactive fragments is rapid at this alkalinity, but these salts do exist. By working rapidly at low temperature, aqueous solutions of these alkaline salts can be washed with a water-immiscible solvent, then returned to the water insoluble sulfate salt.

Salts of the lipoxamycin mixture and lipoxamycin can be used for the same biological purposes as the free base of the lipoxamycin mixture or lipoxamycin, or they can be employed to upgrade the lipoxamycin mixture or lipoxamycin as previously described.

Specific acid salts can be made by neutralizing the free base with the appropriate acid to below about pH 7.5, and advantageously to about pH 2 to pH 6. Suitable acids for this purpose include hydrochloric, sulfuric, phosphoric, acetic, succinic, citric, lactic, maleic, fumaric, pamoic, cholic, palmitic, mucic, camphoric, glutaric, glycolic, phthalic, tartaric, lauric, stearic, salicyclic, 3-phenylsalicylic, 5-phenylsalicylic, 3-methylglutaric, orthosulfobenzoic, cyclohexanesulfamic, cyclopentanepropionic, 1,2-cyclohexanedicarboxylic, 4-cyclohexenecarboxylic, octadecenylsuccinic, octenylsuccinic, methanesulfoni, benzenesulfonic, helianthic, Reinecke's, dimethyldithiocarbamic, sorbic, monochloroacetic, undecylenic, 4'-hydroxyazobenzene-4-sulfonic, octadecylsulfuric, picric, benzoic, cinnamic, and like acids.

The lipoxamycin mixture and lipoxamycin are active against *Escherichia coli* and can be used to reduce, arrest, and eradicate slime production in papermill systems caused by their antibacterial action against this microorganism. They can also be used to prolong the life of cultures of *Trichomonas foetus, Trichomonas hominis,* and *Trichomonas vaginalis* by freeing them of *Escherichia coli* contamination. Further, these novel compounds can be used as the antifungal agent in the shoe uppers disclosed in U.S. Pat. 3,130,505. Also, since these novel compounds are active against *Cryptococcus neoformans*, they can be used to treat pigeon roosts to inhibit this fungus which has been found in pigeon droppings. (Journal of the American Medical Association, volume 191, No. 4, Jan. 25, 1965, pages 269–274). Further, the novel compounds of the invention can be used to swab laboratory benches and equipment in a microbiological laboratory.

The following examples are illustrative of the process and products of the present invention but are not to be construed as limiting. All percentages are by weight and all solvent mixture proportions are by volume unless otherwise noted.

EXAMPLE 1

(A) Fermentation

A soil stock of *Streptomyces virginiae* var. *lipoxae*, NRRL 3630, is used to inoculate 250 ml. Erlenmeyer seed flasks containing 100 ml. of sterile seed medium consisting of the following ingredients:

|   | G. |
|---|---|
| Glucose monohydrate | 25 |
| Pharmamedia [1] | 25 |
| Tap water q.s., 1 liter | |

[1] Pharmamedia is an industrial grade of cottonseed flour produced by Trader's Oil Mill Company, Fort Worth, Tex.

The seed medium pre-sterilization pH is 7.2. The seed inoculum is grown for 3 days at 26–28° C. on a Gump rotary shaker operating at 250 r.p.m.

Seed inoculum, as prepared above, is used to inoculate 500 ml. Erlenmeyer fermentation flasks containing 100 ml. of sterile fermentation medium consisting of the following ingredients:

|   | G. |
|---|---|
| Glucose monohydrate | 60 |
| Kay soy [1] | 20 |
| Brewer's yeast | 2.5 |
| Ammonium chloride | 5 |
| Sodium chloride | 3 |
| Tap water | Balance |

[1] Finely milled fat-extracted soybean meal.

The fermentation flasks are inoculated at the rate of 5 ml. of seed inoculum per 100 ml. of fermentation medium. The presterilization pH of the fermentation flask medium is 7.2. The fermentation flasks are grown for 5 days at a temperature of 28° C. on a Gump rotary shaker operating at 250 r.p.m. Maximum production of the lipoxamycin mixture in a flask fermentation is generally realized in 2 to 3 days after which the titer of the antibiotic gradually drops off. In a typical shake flask fermentation, the shake flask beer assays 3.3 biounits/ml. of lipoxamycin mixture after 2 days; 6.3 biounits/ml. of lipoxamycin mixture after 3 days; and 4.0 biounits/ml. of lipoxamycin mixture after 4 days of fermentation time. The assay used above, and throughout this disclosure, is an agar diffusion-disc method using the microorganism *Saccharomyces pastorianus*. The microorganism is grown on Gray's medium (glucose 30 g., yeast extract 7 g., $KH_2PO_4$ 5 g., agar 20 g., and water 1,000 ml.) and incubated for 16–18 hours at 28° C. A biounit of activity is defined as that quantity of antibiotic necessary to achieve a 20 mm. zone of inhibition from a ½-inch disc treated with 0.08 ml. of test solution.

(B) Extraction

Whole beer (4900 ml.) from a scaled-up fermentation, as described above, assaying 4.6 biounits/ml. of lipoxamycin mixture against *S. pastorianus*, is filtered with the aid of diatomaceous earth. The cake is washed with a 10% volume of water. The filtered beer and wash are combined (4300 ml. assaying 4.0 biounit/ml.). The filtered beer and wash are adjusted to a pH of about 8.5 with a 50% sodium hydroxide solution and extracted twice with half volumes of methylene chloride. The aqueous layer is discarded and the combined solvent extracts are concentrated in vacuo to about 19 liters. This concentrate is mixed well with 10 liters of 1 N $H_2SO_4$ and allowed to stand overnight. Crude crystalline lipoxamycin mixture, as the sulfate salt, separates at the interface of the two layers and is collected by filtration; yield, 98.5 g. of crystalline lipoxamycin mixture as the sulfate salt (48 biounits/mg. potency against *S. pastorianus*).

(C) Purification

Crude crystalline lipoxamycin mixture as the sulfate salt, as obtained above, is recrystallized several times from methanol to give white crystalline flakes sometimes aggregating into pellets. This crystallization provides highly pure preparations of the lipoxamycin mixture as the sulfate salt.

EXAMPLE 2

Preparation of lipoxamycin from the lipoxamycin mixture.

The lipoxamycin mixture, obtained above, as the recrystallized salt, is subjected to countercurrent distribution in order to separate lipoxamycin therefrom. The lipoxamycin mixture sulfate salt is converted to the p-toluenesulfonic acid salt of the lipoxamycin mixture by combining equimolar amounts of the lipoxamycin mixture sulfate salt (421 mg.) and of the barium salt of p-toluenesulfonic acid (240 mg.) in 40 ml. of methanol. This mixture is then heated, cooled, centrifuged to remove $BaSO_4$, and the centrifugate evaporated to dryness in vacuo. A hot ethyl acetate solution of this residue is cooled to produce crystalline lipoxamycin mixture p-toluenesulfonic acid salt (200 mg. first crop M.P. 120–122° C., and 240 mg. second crop). Two grams of this lipoxamycin mixture p-toluenesulfonic acid salt is loaded into the first five tubes and transferred 195 times between the phases of a system of ethyl acetate, ethylene glycol monomethyl ether, water (2:1:1) in a 10 ml./phase automatic Craig distribution machine. Lipoxamycin is isolated in the pure form from the Craig apparatus by combination and evaporation in vacuo of the appropriate tubes (numbers 40–49 in this example) determined to be only lipoxamycin by paper chromatography. The residue is crystallized from ethyl acetate to give 43 mg. of lipoxamycin p-toluenesulfonic acid salt. Lipoxamycin sulfate salt is prepared from an aqueous solution of the p-toluenesulfonic acid salt by the addition of sulfuric acid and filtration of the resulting lipoxamycin sulfate salt. Lipoxamycin sulfate salt is recrystallized from methanol.

EXAMPLE 3

By substituting the barium salt of p-bromobenzenesulfonic acid for the p-toluenesulfonic acid in Example 2, there is obtained the lipoxamycin mixture as the p-bromobenzenesulfonic acid salt.

EXAMPLE 4

By substituting the barium salt of acetic acid for the p-toluenesulfonic acid in Example 2, there is obtained the lipoxamycin mixture as the acetate salt.

EXAMPLE 5

By dissolving the lipoxamycin mixture sulfate salt, as obtained in Example 1, in dilute sodium hydroxide to a pH of about 8.5, and extracting this solution with ethyl acetate, there is obtained the lipoxamycin mixture in the crystalline free base form.

EXAMPLE 6

By treating the lipoxamycin mixture in a free base form, as obtained in Example 5, with oxalic acid, there is obtained the lipoxamycin mixture as the oxalate salt.

EXAMPLE 7

By substituting iodic acid for oxalic acid in Example 6, there is obtained the lipoxamycin mixture as the iodate salt.

EXAMPLE 8

By substituting hydrochloric acid for oxalic acid in Example 6, there is obtained the lipoxamycin mixture as the chloride salt.

EXAMPLE 9

Salts of lipoxamycin are obtained by the same procedures as given in the above examples for preparing salts of the lipoxamycin mixture.

EXAMPLE 10

By substituting lipoxamycin sulfate for lipoxamycin mixture sulfate salt in Example 5, there is obtained crystalline lipoxamycin in the free base form.

Paper chromatography of recovery and purification materials, described herein, is conducted using a solvent system consisting of 1-butanol, water (4:96), +0.25% p-toluenesulfonic acids for 5 hours. The paper sheet is bioautographed in the standard manner using *S. pastorianus*.

The solvent systems used in FIG. 3 of the drawing are as follows:

(I) 1-butanol, water (84.16), 16 hrs.
(II) 1-butanol, water (84:16) +0.25% p-toluenesulfonic acid, 16 hrs.
(III) 1-butanol, acetic acid, water (2:1:1), 16 hrs.
(IV) 2% piperidine (v./v.) in 1-butanol, water (84:16), 16 hrs.
(V) 1-butanol, water (4:96), 5 hrs.
(VI) 1-butanol, water (4:96), +0.25% p-toluenesulfonic acid, 5 hrs.

What is claimed is:
1. A composition of matter lipoxamycin mixture having the following characteristics:
   (a) it is effective in inhibiting the growth of various fungi and Gram-positive and Gram-negative bacteria;
   (b) it has a characteristic papergram pattern in fermentation beer as shown in FIG. 2 of the accompanying drawing;
   (c) it has the following elemental analyses: C, 61.75, 61.27; H, 9.70, 9.72; N, 7.47; O, 21.40;
   (d) it has an optical rotation $[\alpha]_D^{25} = -2°$ (c., 0.877 in methanol);
   (e) it has a melting point of 68–70° C. dec.;
   (f) it has the following strong and medium intensity bands in its infrared absorption spectrum when suspended in mineral oil mull: 2930 (S), (oil), 2900 (S), (oil), 2840 (S), (oil), 1700 (S), 1650 (M), (sh), 1640 (M), 1567 (M), 1460 (S), (oil), 1410 (M), 1375 (S), (oil), 1365 (M), (sh), 1200 (M), 1090 (M); and, as its sulfate salt,
   (g) it has the following elemental analyses: C, 54.30; H, 9.01; N, 6.36; S, 3.75;
   (h) it has a melting point range of 154–155° C. dec.;
   (i) it has an optical rotation $[\alpha]_D^{25} = -7°$ (c., 0.408 in dimethylsulfoxide);
   (j) it has a characteristic ultraviolet spectrum in MeOH as follows: λ max. 209, ε, 5600 and 275 sh., ε, 63;
   (k) it has an equivalent weight of 209 with the first break at 437; and,
   (l) it has a characteristic infrared absorption spectrum as shown in FIG. 1 of the accompanying drawing.
2. The composition of matter of claim 1 in dry form, said composition of matter assaying at least 48 biounits/mg. on the *Saccharomyces pastorianus* assay.
3. A compound selected from the group consisting of the lipoxamycin mixture, according to claim 1, and the salts thereof.
4. The composition of matter of claim 1 in the form of its sulfate salt.
5. A composition of matter of claim 1 in the form of its p-toluenesulfonic acid salt.
6. The compound, according to claim 5, in its essentially crystalline form.
7. A process, for making the compound defined in claim 1, which comprises cultivating *Streptomyces virginiae* var. *lipoxae*, having the identifying characteristic of N.R.R.L. 3630, in an aqueous nutrient medium under aerobic conditions until substantial activity is imparted to said medium by the production of the lipoxamycin mixture.
8. A process for making the compound defined in claim 1 which comprises cultivating *Streptomyces virginiae* var. *lipoxae*, having the identifying characteristics of NRRL 3630, in an aqueous nutrient medium containing a source of assimilable carbohydrate and assimilable nitrogen under aerobic conditions until substantial activity is imparted to said medium by the production of the lipoxamycin mixture, and isolating the lipoxamycin mixture so produced.
9. A process, according to claim 8, in which the isolation comprises filtering the medium, extracting the resulting filtrate with a water-immiscible solvent for the lipoxamycin mixture, and recovering the lipoxamycin mixture from the solvent extract.
10. Lipoxamycin, a compound which as its sulfate salt
   (a) is effective in inhibiting the growth of various fungi and Gram-negative and Gram-positive bacteria;
   (b) has the following solubilities.

At 25° C.:

|  | Mg./ml. |
|---|---|
| $H_2O$ | <1 |
| $CH_3OH$ | 1 |
| (hot) | 10 |
| Dimethylformamide | 5 |
| Methylpyrrolidone | 5 |
| Dimethylsulfoxide | 15 |

Lipoxamycin is relatively insoluble in hydrocarbons and chlorinated hydrocarbons;
   (c) has the following elemental analyses: C, 54.18; H, 8.93; N, 6.27; S, 3.72;
   (d) has a melting point of about 153.3° C. dec.;

(e) has an optical rotation $[\alpha]_D^{25} = -10°$ (c., 0.696 dimethylsulfoxide);

(f) has a characteristic ultraviolet spectrum in MeOH as follows: $\lambda$ max. 208, $\epsilon$, 5450 and 275 sh, $\epsilon$, 63;

(g) has a characteristic infrared absorption spectrum as shown in FIG. 1 of the accompanying drawing; and which (h) has a characteristic papergram pattern as shown in FIG. 3 of the accompanying drawing.

11. The compound, lipoxamycin, according to claim 10, in its essentially pure form.

12. A compound selected from the group consisting of lipoxamycin, according to claim 10, and the salts thereof.

13. A composition of matter of claim 10 in the form of its sulfate salt.

14. The compound, lipoxamycin, according to claim 13 in its essentially pure crystalline form.

15. A process for making the compound defined in claim 10 which comprises cultivating Streptomyces virginiae var. lipoxae, having the identifying characteristics of NRRL 3630, in an aqueous nutrient medium containing a source of assimilable carbohydrate and assimilable nitrogen under aerobic conditions until substantial activity is imparted to said medium by the production of the lipoxamycin mixture, isolating the lipoxamcin mixture so produced, resolving said lipoxamycin mixture by countercurrent distribution and isolating lipoxamycin free of said lipoxamycin mixture.

References Cited

Miller, Pfizer Handbook of Microbial Metabolites, McGraw-Hill Book Co., Inc., N.Y., 1961, page 429.

JEROME D. GOLDBERG, Primary Examiner

U.S. Cl. X.R.

195—80; 424—121